(No Model.)
W. S. ANDREWS & T. SPENCER.
DYNAMO.
No. 406,415. Patented July 9, 1889.
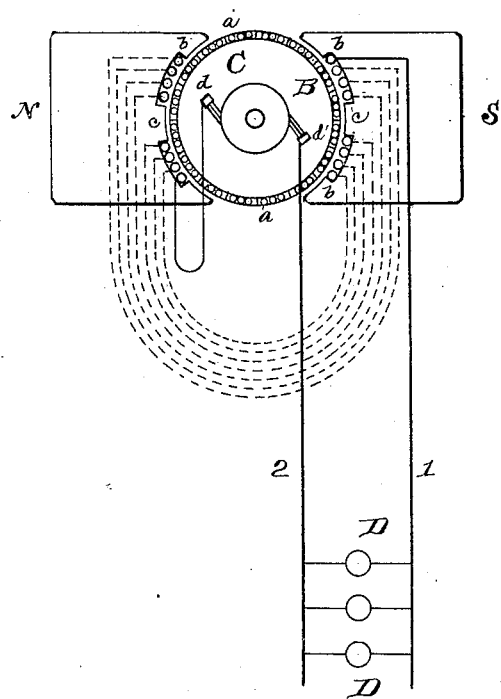

UNITED STATES PATENT OFFICE.

WILLIAM S. ANDREWS, OF NEW YORK, N. Y., AND THOMAS SPENCER, OF WESTBROOK, CONNECTICUT.

DYNAMO.

SPECIFICATION forming part of Letters Patent No. 406,415, dated July 9, 1889.

Application filed August 17, 1886. Serial No. 211,100. (No model.)

*To all whom it may concern:*

Be it known that we, WILLIAM S. ANDREWS, of New York, in the county and State of New York, and THOMAS SPENCER, of Westbrook, in the county of Middlesex and State of Connecticut, have jointly invented a certain new and useful Improvement in Dynamo-Electric Machines, of which the following is a specification.

The object of our invention is to produce a simple and convenient construction of dynamo-electric machine or electro-dynamic motor, in which the non-sparking points on the commutator shall always remain at the same position in spite of any changes of load or of armature-current. In accomplishing this we provide stationary coils situated externally to the armature and supported upon the field-magnet poles, which coils are wound and connected so as to oppose the magnetizing effect on the armature-core of the generating-coils.

Our invention is illustrated in the annexed drawing which shows in elevation the polar-extensions and armature of a dynamo-electric machine with the connections of the stationary coil in diagram.

N S are the polar-extensions of the field-magnet.

B is the armature, wound, as usual, with coils $a$ $a$; and C is the commutator, with the conducting-bars of which said armature-coils are connected.

The pole-pieces N S are provided with grooves $b$ $b$, and in these grooves are wound, parallel with the armature-coils, coils $c$ $c$. These coils are connected in series with the generating-coils, a wire extending from commutator-brush $d$ to one terminal of the coils, and such coils being then wound back and forth and crossing one end of the armature, as shown by the dotted lines, and finally being connected with conductor 1 of the main circuit, conductor 2 of which extends from commutator-brush $d'$.

D D are electric lamps or other translating devices connected with the said main conductors. The coils $c$, being so wound and connected that the current passes through them in a direction contrary to that of the current in coils $a$, it will be seen that any change in the armature-current will act equally and oppositely in said sets of coils, and the effect of such change on the armature-core will be neutralized. The non-sparking points, therefore, will always remain the same, and the necessity for shifting the commutator-brushes when a change in load or in speed occurs is avoided.

It is evident that our invention is equally applicable to dynamo-electric machines used either as generators or as motors.

The stationary winding may be of copper or iron wire or bars, according to the conductivity required.

What we claim is—

1. In a dynamo-electric machine, the combination of the armature, the generating-coils thereon, the field-magnet, and the external stationary coils supported upon said field-magnet and wound so as to oppose the magnetizing effect on the armature-core of said generating-coils, substantially as set forth.

2. In a dynamo-electric machine, the combination of the armature, the generating-coils thereon, the field-magnet having grooves in its pole-pieces, and the coils wound in said grooves, so as to oppose the magnetizing effect on the armature-core of said generating-coils, substantially as set forth.

This specification signed and witnessed this 16th day of August, 1886.

WILLIAM S. ANDREWS.
THOMAS SPENCER.

Witnesses:
H. W. LUCY,
W. E. GILMORE.